United States Patent [19]
Santén

[11] Patent Number: 4,611,332
[45] Date of Patent: Sep. 9, 1986

[54] TRANSFERRED ELECTRIC ARC

[75] Inventor: Sven Santén, Hofors, Sweden

[73] Assignee: SKF Steel Engineering Aktiebolag, Hofors, Sweden

[21] Appl. No.: 641,404

[22] Filed: Aug. 14, 1984

Related U.S. Application Data

[63] Continuation of Ser. No. 385,059, Jun. 4, 1982, abandoned.

[30] Foreign Application Priority Data

Sep. 3, 1981 [SE] Sweden .............................. 8105225

[51] Int. Cl.$^4$ ............................................. H05B 7/00
[52] U.S. Cl. ...................................... 373/24; 75/10.22
[58] Field of Search ....................... 373/24, 18, 21, 22, 373/23; 75/10 R, 11

[56] References Cited

U.S. PATENT DOCUMENTS

| 750,361 | 1/1904 | Harmet. | |
|---|---|---|---|
| 3,422,206 | 1/1969 | Baker et al. | 373/24 |
| 3,749,803 | 7/1973 | Camacho | 373/24 |
| 4,072,504 | 2/1978 | Perdahl et al. | |
| 4,340,420 | 7/1982 | Santen et al. | 373/24 UX |
| 4,425,659 | 1/1984 | Stenkvist | 373/24 |

FOREIGN PATENT DOCUMENTS 80065220 9/1980 Sweden.

Primary Examiner—Roy N. Envall, Jr.
Attorney, Agent, or Firm—Armstrong, Nikaido, Marmelstein & Kubovcik

[57] ABSTRACT

In a method for supplying thermal energy by means of a plasma arc heater to a reactor filled with solid, lump reduction material, the thermal energy is supplied via an outer or transferred arc, one electrode of which is formed by the heater and the other electrode of which is formed by the reduction material in the reactor.

5 Claims, 1 Drawing Figure

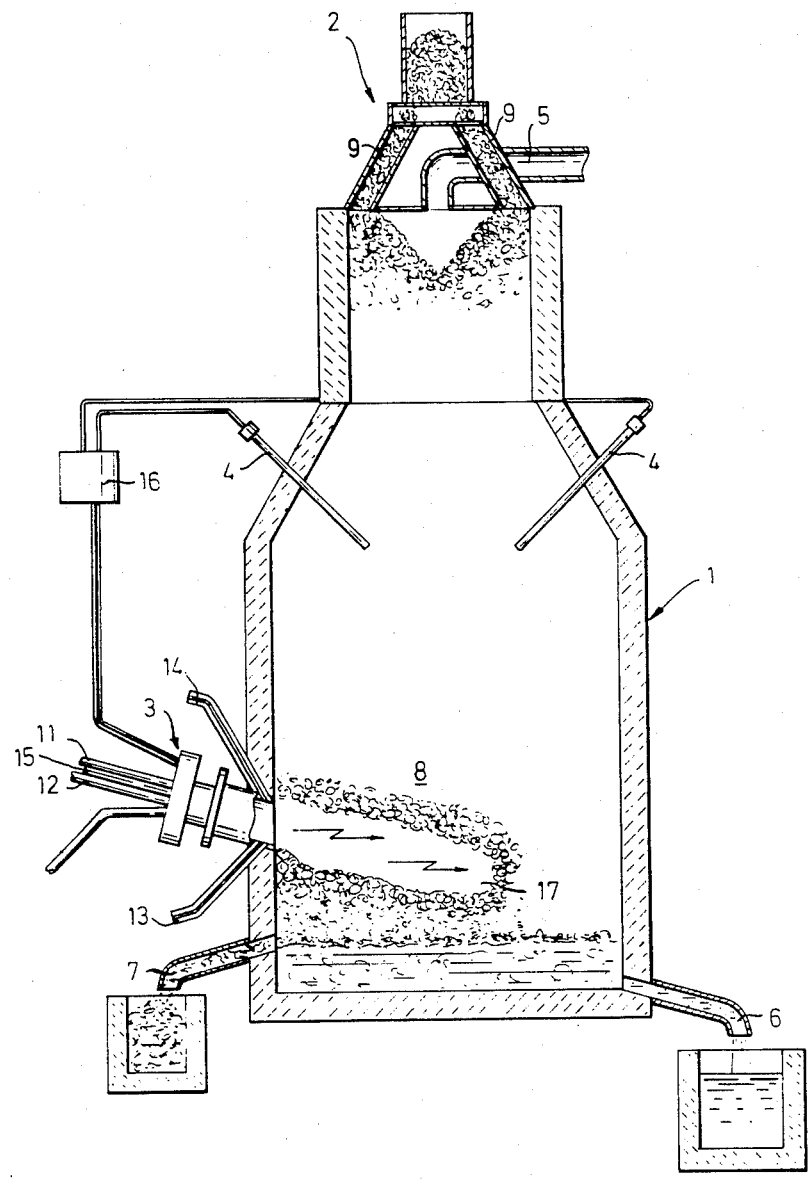

TRANSFERRED ELECTRIC ARC

This application is a continuation of U.S. application Ser. No. 385,059, filed June 4, 1982 now abandoned.

The present invention relates to a method of using a plasma arc heater for the supply of thermal energy to a reactor, and to an apparatus for carrying out the method. The reactor resembles a shaft furnace and is filled with solid, lump reduction material, into which reactor powder material is fed and endothermic reactions, preferably the reduction of metal oxide to metal, occur.

In the production of metals from material containing metal oxide, by means of a reduction gas in a shaft furnace filled with reducing agent, it is known, per se, to supply thermal energy to the reduction gas by means of a plasma arc heater. The gas is caused to flow through an electric arc generated in the heater, whereupon the gas is converted to plasma form. The powdered metal oxide material is injected, together with the reduction gas, and is supplied to the gas downstream of the electric arc, i.e. to the plasma gas formed. Gas which contains oxygen, slag former, carbonaceous material such as hydrocarbons, oil or a coal slurry etc. can also be supplied upstream of, in, and/or downstream of the electric arc. This process is extremely effective and advantageous, both economically and technically, but certain problems remain to be solved.

Present plasma arc heaters utilize an inner arc, that is, one generated between two spaced electrodes in the heater. When the very hot plasma gas which is generated comes into contact with the walls of the heater there is considerable heat dissipation to the walls. To avoid this, the gas is caused to rotate so that cold gas sweeps over the electrode surfaces, increasing the efficiency. However, this also results in various drawbacks. The rotation of the gas causes it to be thrown radially outwards when it streams out of the heater. The walls of the reactor vessel are hereby subjected to very considerable local stresses, resulting in rapid deterioration of the furnace lining in this area thus causing operational stoppages and expensive repairs. The rotation of the gas also causes difficulties in injecting powdered material into the gas stream, since small particles tend to be thrown out of the gas flow due to the rotation.

Other drawbacks are that plasma arc heaters with an inner arc cause very heavy wear on both of the electrodes, which must be often changed. Furthermore, a large part of the heat losses in the heater consist of electrode losses.

It has now been quite surprisingly found that, in the method disclosed in the introduction of this specification, it is possible to substantially eliminate the above drawbacks.

Accordingly, the present invention provides a method of using a plasma arc heater for the supply of heat energy to a reactor in the form of a shaft furnace filled with reduction material, comprising passing a reduction entirely or partially through the heater and converting it to gas plasma; supplying powdered material to the reactor for performing endothermic reactions; and supplying the thermal energy through an outer electric arc, one electrode of which is formed by the heater and the other electrode of which is formed by the material in the shaft furnace.

The utilization of an outer or transferred arc is known per se in the steelmaking art, although solely for melting steel, i.e. scrap melting. An inert gas such as argon is used as a plasma gas in this technique, the gas only being used to form a medium for the electric arc and not taking part in any chemical reaction. In this known process, see the "Iron and Steel Engineer", October 1980 pages 81-82 "Plasma steelmaking—The Freital system" a plasma smelting furnace is utilized, with several angularly placed plasma arc heaters coacting with a central bottom electrode. The principle is generally the same as for conventional electric arc furnaces, but the vertical graphite electrodes are replaced by arc heaters. However, utilizing a transferred arc in accordance with the present invention, where the reducing agent in the reactor is utilized as an electrode for direct reduction of metal oxide to metal has never been proposed nor practised.

By means of the method of this invention, it has been surprisingly found possible to provide a stable arc between, on the one hand, the solid reduction material in the reactor and, on the other hand, the arc heater projecting through the reactor wall. In the starting-up phase, a cavity is formed immediately upstream of the heater exit, due to the very high temperature. The desired reactions subsequently take place in this cavity. It is also surprising that the solid reduction agent in the reactor is consumed only to a very small extent after the cavity has been formed, and that there is no collapse of the solid material, which would lead to an unstable arc.

The method in accordance with the invention also provides the substantial advantage that electrode wear on at least one electrode is completely eliminated, since the reduction agent functions as the electrode. When the reducing material, e.g. coke, functions as electrode, a portion of it will naturally be consumed, but even so, this will be of benefit to the process in the form of carbon oxidized to carbon monoxide and carbon dioxide. Furthermore, it is no longer necessary to keep the gas in rotation, which both facilitates the supply of powdered material to the gas stream and prevents the deleterious effects on the furnace lining experienced in conventional processes.

A further advantage lies in the fact that one electrode voltage drop occurs in the reduction agent, thus further improving the efficiency by about 5%, which is a considerable increase in an already high efficiency.

The invention also provides apparatus for carrying out an endothermic reaction using plasma arc heaters for the supply of thermal energy to a reactor by use of a reduction gas which is entirely or partially taken through the heater and converted to gas plasma, comprising: a reactor in the form of a shaft furnace to be filled with reduction material, a charging top at the upper part of the reactor for providing continuous supply of solid, lump reduction material and for providing a pressure drop so that hot gases in the reactor do not depart via the top countercurrent to the said supply thereat; a gas outlet in the upper portion of the reactor; outlets at the bottom of the reactor for metal and slag, respectively; a plasma arc heater, having supply conduits for powdered material and reduction gas in the lower portion of the reactor and connected to a current source; and current conductors positioned to be immersed in reduction material having been fed via said charging top, said current conductor being connected to the current source of the heater so that the reducing material can form one electrode and the plasma arc heater forms the other electrode in an electric circuit for generating an outer electric arc.

Preferably the current conductors are grounded, thereby also grounded the reduction agent in use of the reactor. The advantage is hereby gained that no insulation need be arranged between the heater and the furnace, since the heater casing is also connected to ground. Thus all risk to personnel working with the plant caused by the arc electricity, is totally eliminated.

In order that the present invention may more readily be understood an embodiment thereof will now be described, merely by way of example, with reference to the accompanying drawing, in which the sole FIGURE illustrates an embodiment of the apparatus in accordance with the invention.

The FIGURE illustrates only a schematic view of a preferred embodiment of the apparatus in accordance with the invention, and the details incorporated therein can be given other embodiments without departing from the inventive concept as defined by the claims.

In principle, the apparatus includes a reactor 1 having a sealing, charging top 2 arranged thereon, and incorporating at least one plasma arc heater 3 and current conductors 4.

The reactor 1, resembling a shaft furnace, is equipped at its upper portion with a gas outlet 5 for gas and any volatile metals. At its lower portion the reactor 1 has an outlet 6 for metal and a higher outlet 7 for slag. The reactor is, in use, filled with solid lump reduction material 8 which, as it is consumed, is continuously supplied to the reactor via the charging top 2.

The charging top 2 preferably includes a plurality of closed supply ducts 9 uniformly distributed round the periphery of the reactor 1. The top 2 permits continuous supplying of the reducing material, as required, while at the same time forming a gas trap, i.e. the pressure drop along the ducts 9 is so great that the gas is unable to get out that way. For the sake of safety, nitrogen under pressure can be supplied to the plenum chamber which feeds the ducts. The gas outlet 5 is shown on the FIGURE as being centrally arranged in the top, but it can alternatively be arranged in the side of the reactor 1. The illustrated structure is most suitable for the embodiment of the top described.

The plasma arc heater 3 is only shown schematically, and not in section, since its function is quite clear from the description below. It comprises two cylindrical electrodes with an intermediate annular gap. At least a portion of the reduction gas is supplied through this gap, possibly together with a hydrocarbon or other material via the conduits 11, 12. Lances or nozzles 13, 14 are arranged at the forward portion of the heater for injecting powdered material and possibly oxygen, water, and/or slag former. The heater can further be constructed with an upstream inlet 15, for compressed gas such as argon or air, for blowing into the reactor an arc conventionally formed between said two cylindrical electrodes. As a rule it is sufficient to increase the inflow speed of the reduction gas which is fed to the annular gap, for the arc to be blown into the reactor and to strike against the reduction material therein.

Current conductors 4 are arranged to be immersed in the reduction material 8, the conductor suitably being in communication with the same current source 16 as drives the heater 3. The conductors are in communication with ground, as is the heater casing. As already mentioned above, problems are thus avoided with respect to insulation and operator safety.

A description of the electrical equipment has intentionally been excluded, since this is no part of the present invention, and to design a suitable system is readily within the ability of the average worker in this art. However, it should be noted that the heater is connected so that once the arc generated between the cylindrical electrodes is blown into the reactor, and a stable arc is struck between the heater 3 and the reducing material 8, one of the electrodes in the heater becomes disconnected from the current circuit.

When the process is started, an inner arc is thus struck between the two cylindrical electrodes of the heater. The gas plasma thus formed, which has a temperature in the order of 5000° C., then burns away the reduction material immediately in front of the heater so that a cavity 17 is formed. The reactions subsequently take place in this cavity 17. Hereafter, or rather consecutively herewith, the arc is blown into the cavity and strikes against the reducing material after which one of the heater electrodes can be disconnected. After this has taken place, the reducing material will be consumed to a very small extent, in contrast to all other plasma processes where this material is continuously consumed.

I claim:

1. A method of chemical reduction in a shaft furnace comprising the steps of:
   (a) providing a plasma arc heater having at least two cylindrical electrodes in the wall of said furnace such that the plasma gas generated by such heater may be directed into said furnace;
   (b) continuously maintaining said furnace substantially filled with reduction material;
   (c) generating a first inner electric arc between two of said at least two cylindrical electrodes;
   (d) passing a reducing gas through said plasma arc heater thereby to convert said gas to a plasma gas;
   (e) causing said plasma gas to burn away the reduction material immediately in front of the heater so as to form a reaction cavity in front of the heater;
   (f) transferring said arc from between said two electrodes such that it is blown into the cavity and thence extends between only one of said electrodes and said reduction material contained in the furnace, said arc being caused to substantially only so extend by providing at least one current conductor in electrical contact with said reduction material, said current conductor permitting the completion of an electric arc between the electrode and the reduction material, said current conductor being located such that substantially no electric arc extends between said electrode and said current conductor;
   (g) supplying powdered material containing the material to be reduced into said cavity; and
   (h) reducing said material to be reduced and withdrawing the so reduced material from the reactor.

2. A method according to claim 1 wherein the powdered material is fed into the plasma gas.

3. A method according to claim 1 wherein the powdered material is supplied together with at least one additive material selected from the group consisting of oxygen, water and slag former.

4. A method according to claim 1 wherein the chemical reduction is the direct reduction of metal oxide to metal.

5. Apparatus for carrying out an endothermic reaction using a plasma arc heater for the supply of thermal energy to a reactor by use of a reduction gas which is entirely or partially taken through the heater and converted to gas plasma, such apparatus comprising:

(a) a reactor in the form of a shaft furnace having upper and lower portions, said reactor adapted to be filled with reduction material in use of the apparatus;
(b) a charging top to said reactor;
(c) means in said charging top for providing continuous supply of solid, lump reduction material to said reactor and for providing a pressure drop so that hot gases in the reactor do not depart via the top countercurrent to the said supply thereat;
(d) a gas outlet in the upper portion of the reactor;
(e) outlet means at the bottom of the reactor for metal and slag;
(f) a plasma arc heater in the lower portion and in the wall of said reactor positioned such that the plasma gas generated by said heater may be directed into said reactor, said plasma arc heater having at least two cylindrical electrodes positioned such that a first inner electric arc can be generated between two of said at least two cylindrical electrodes;
(g) supply means to said plasma arc heater for injecting powdered material and reduction gas into the lower portion of the reactor, said supply means being adapted so as to permit said inner electric arc to be blown into said reactor and thence to be transferred and to extend between only one of said cylindrical electrodes and said reduction material in said reactor;
(h) a current source for said plasma arc heater;
(i) means connecting said plasma arc heater to said current source;
(j) at least one current conductor positioned to be immersed in and in electrical contact with said reduction material having been fed in said charging top, said current conductor being positioned in said reactor such that when the reactor is substantially filled with said reduction material substantially no electric arc extends between said heater and said conductor; and
(k) electric circuit means connecting said at least one current conductor to said current source for the heater.

* * * * *